Oct. 17, 1933.                    D. HEYER                   1,930,593
                          VALVE CONTROLLING MECHANISM
                          Filed April 3, 1930        5 Sheets-Sheet 1

Don Heyer, Inventor

Oct. 17, 1933.　　　　D. HEYER　　　　1,930,593
VALVE CONTROLLING MECHANISM
Filed April 3, 1930　　　5 Sheets-Sheet 2

Don Heyer, Inventor

Oct. 17, 1933.                D. HEYER                1,930,593
                    VALVE CONTROLLING MECHANISM
                      Filed April 3, 1930          5 Sheets-Sheet 3
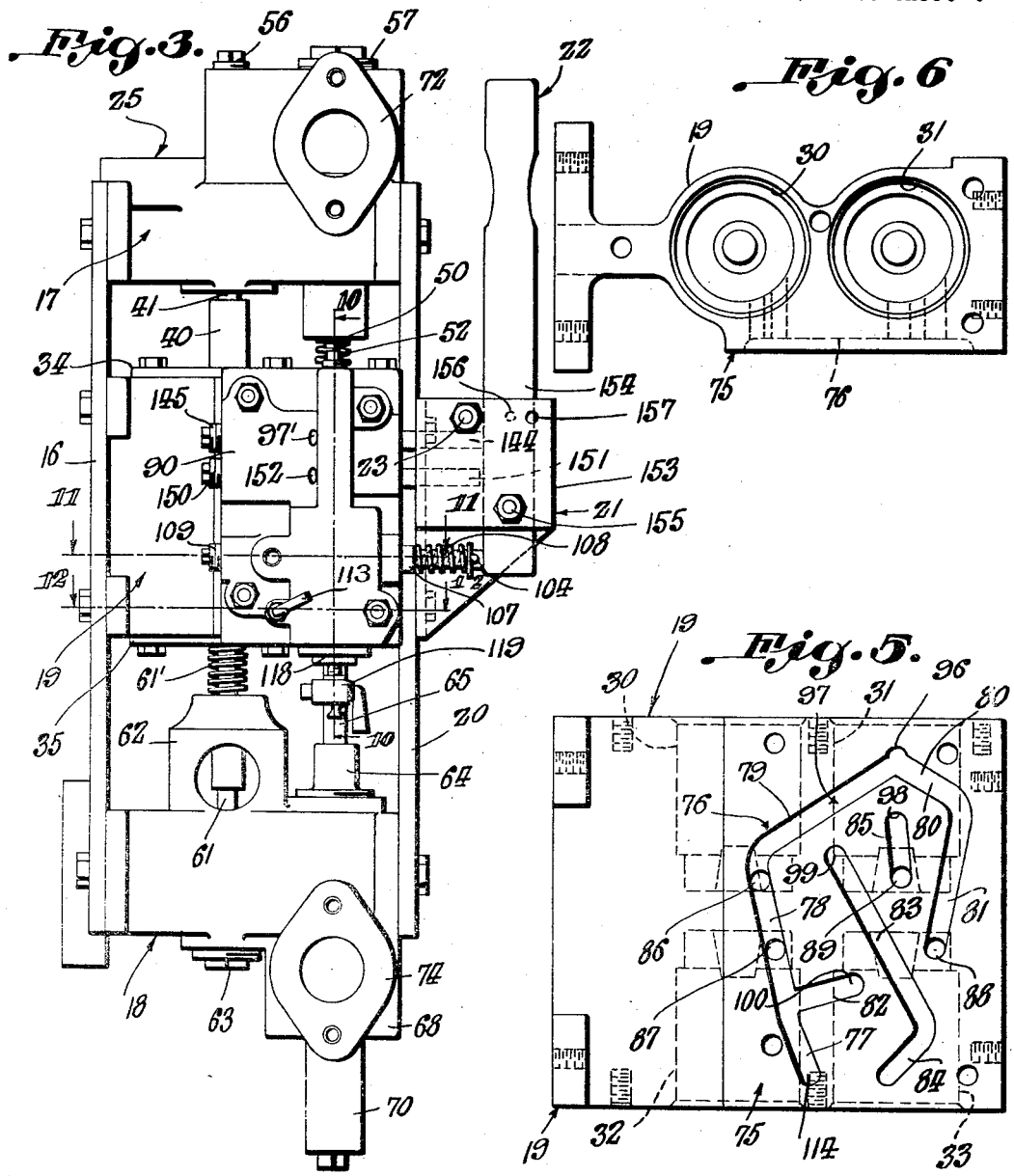
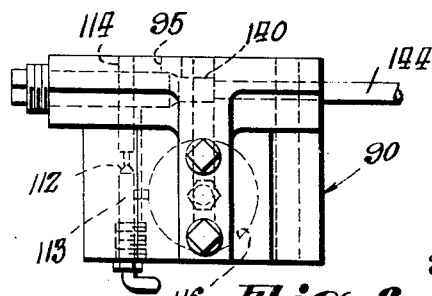
Don Heyer, Inventor
Attorney

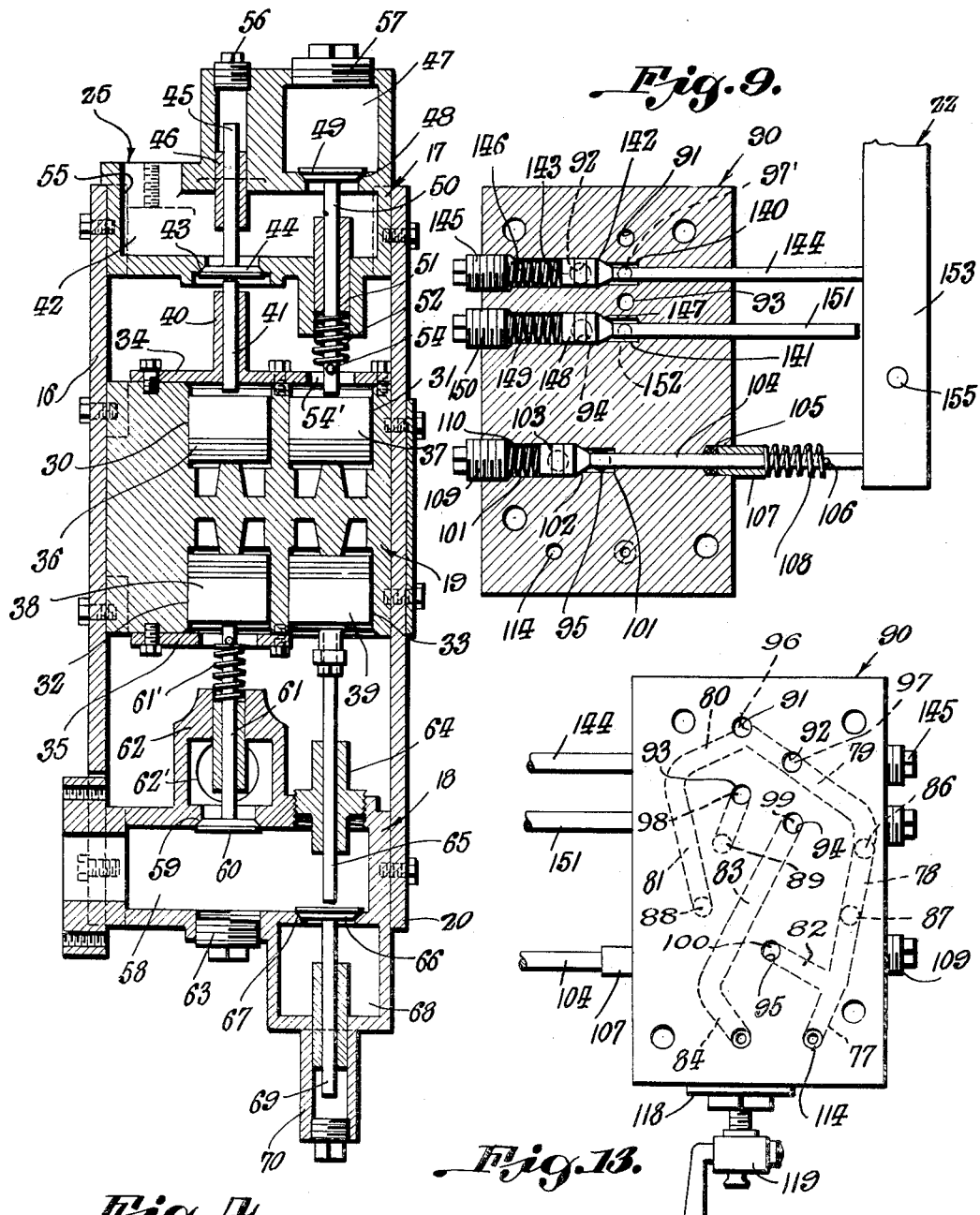

Oct. 17, 1933. D. HEYER 1,930,593
VALVE CONTROLLING MECHANISM
Filed April 3, 1930 5 Sheets-Sheet 5
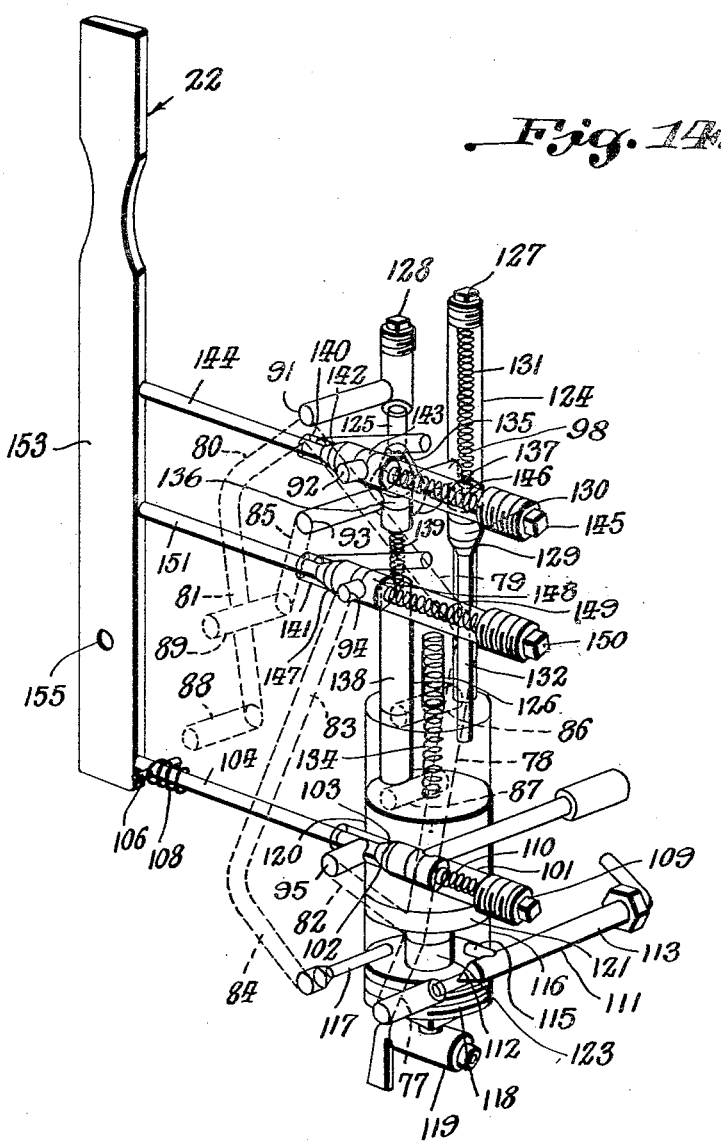
Don Heyer, Inventor Patented Oct. 17, 1933

1,930,593

UNITED STATES PATENT OFFICE 1,930,593

VALVE CONTROLLING MECHANISM

Don Heyer, Los Angeles, Calif.

Application April 3, 1930. Serial No. 441,367

9 Claims. (Cl. 121—21)

This invention relates to new and useful improvements in control mechanisms, and particularly to control valve mechanisms adapted for use in connection with pavement breaking machines, pile drivers, presses, jack hammers, and the like.

One object of the invention is to provide a device of this character wherein the operator can more conveniently and easily operate the same by reason of the fact that he moves the control valves transversely of the path of the pressure fluid, instead of against such pressure, as in similar devices heretofore, thus relieving the operator of the vibrations issuing directly from the device.

Another object is to provide a device of this character wherein the force of the blow of the tool can be quickly and easily regulated, in accordance with the character of the work to be operated upon.

Another object is to provide a device of this character wherein an efficient cushion is formed beneath the piston, whereby to prevent breakage of the parts should the tool suddenly pass through the work.

Other objects and advantages will be apparent from the following description when taken in connection with the accompanying drawings.

In the drawings:

Figure 3 is an enlarged elevation of the control mechanism.

Figure 4 is an enlarged vertical sectional view on the line 4—4 of Figure 1.

Figure 5 is an elevation of the valve operating piston block, showing the grooves and ports therein.

Figure 6 is a top plan view of the block shown in Figure 5.

Figure 8 is a top plan view of the parts shown in Figure 7.

Figure 9 is a sectional view on the line 9—9 of Figure 7.

Figure 13 is a view of the face of the block 90, which contacts with the face of the block 19.

Figure 14 is a diagrammatic view showing the arrangement of the valves and passages in the valve chest.

Figure 1:
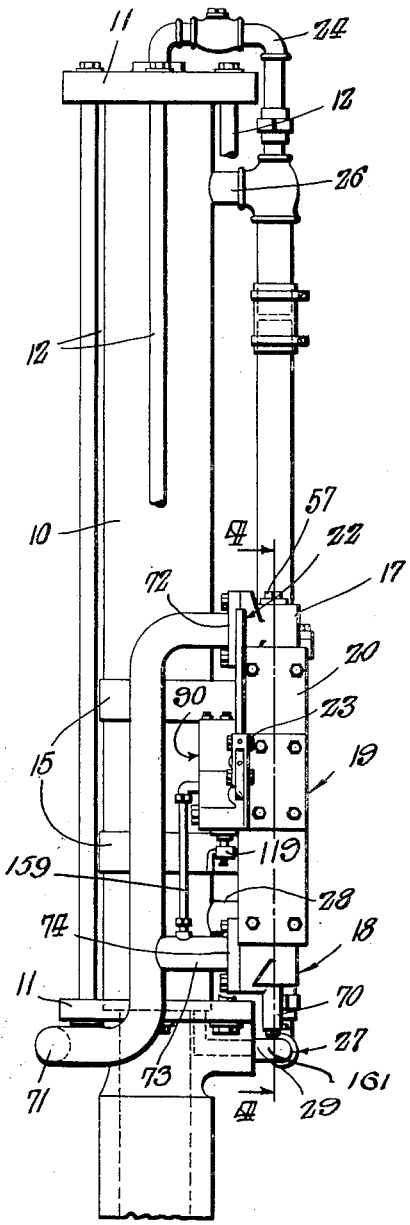
Figure 1 is a side elevation of a portion of a pavement breaking machine equipped with the control mechanism of the present invention.
Figure 7:
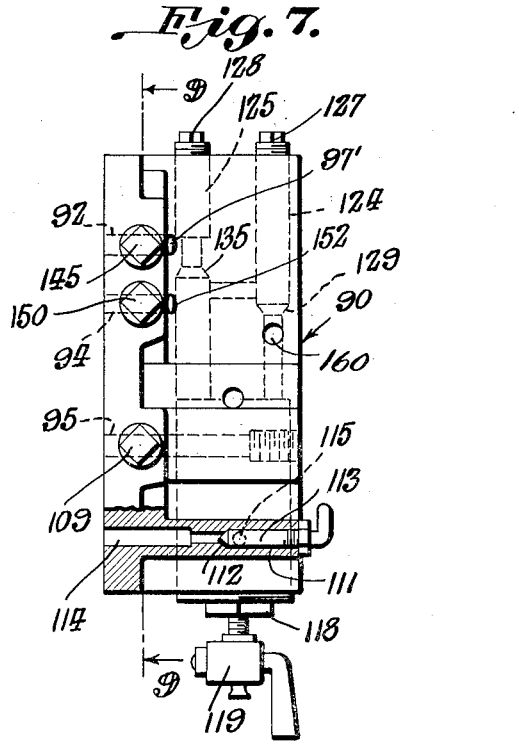
Figure 7 is an enlarged side elevation of the piston valve block, and the valve block attached thereto, the same being broken away to show the needle valve.
Figure 12:
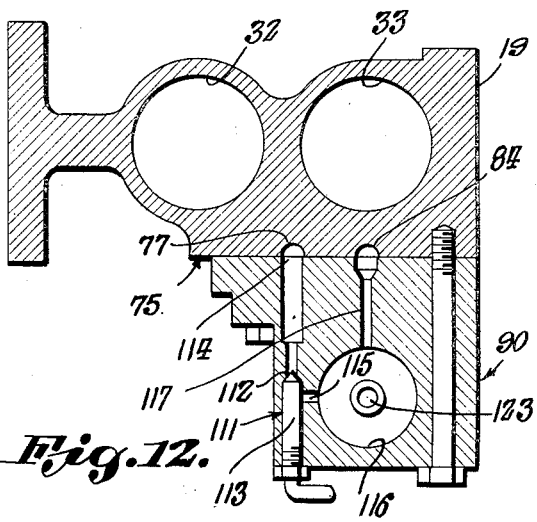
Figure 12 is a sectional view on the line 12—12 of Figure 3.
Figure 2:
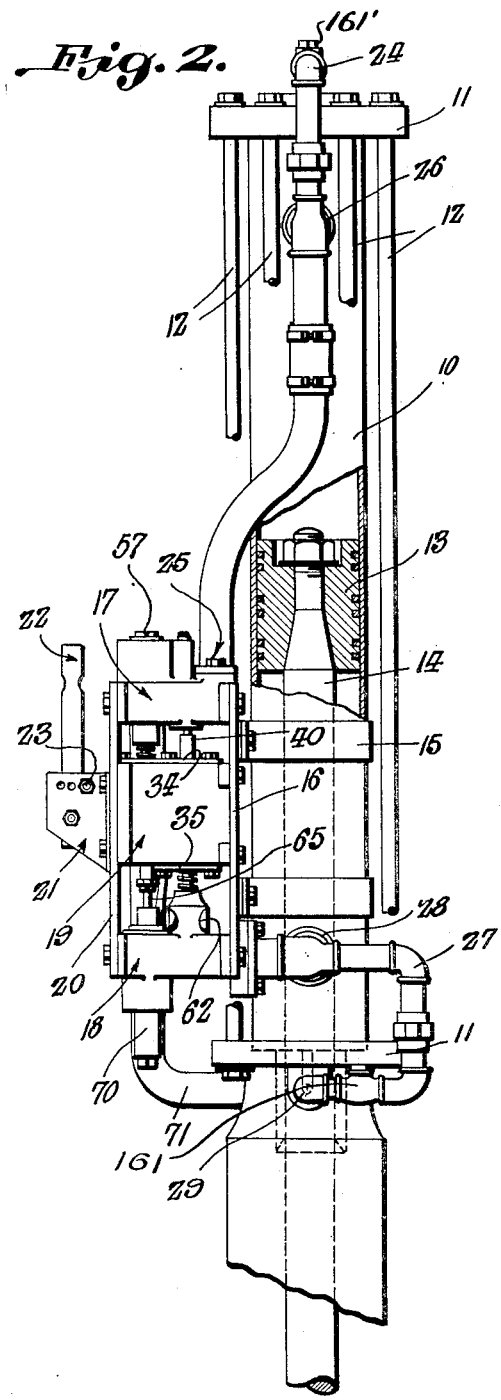
Figure 2 is a front elevation of the same, partly broken away, to show the power piston.
Figure 10:
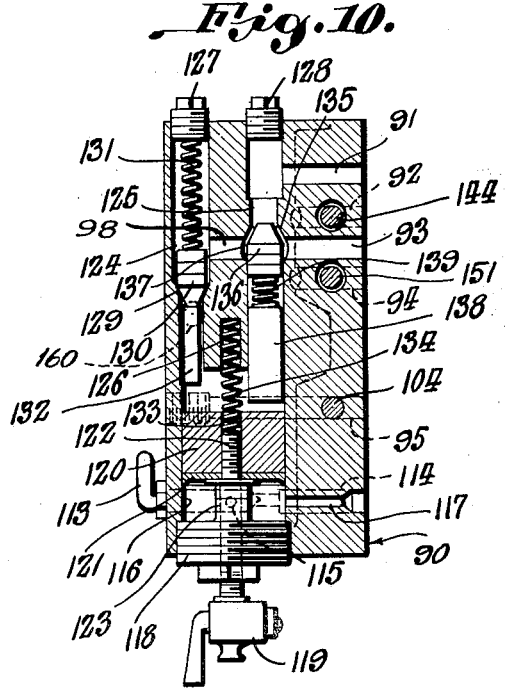
Figure 10 is a sectional view on the line 10—10 of Figure 3.
Figure 11:
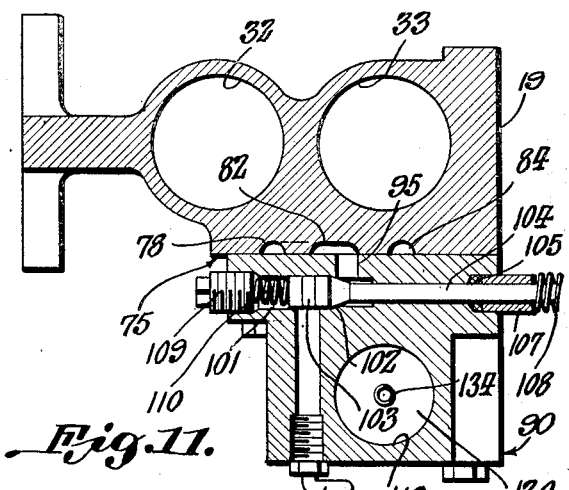
Figure 11 is a sectional view on the line 11—11 of Figure 3.

Referring particularly to the accompanying drawings, 10 shows the cylinder of a pavement breaker having the end members, or heads 11 secured thereon by means of the bolts 12, which extend therebetween. Slidable in the cylinder is the power piston 13, having the piston rod 14 attached thereto and extending through the lower end of said cylinder, where it has suitable means for holding a suitable tool, (not shown), said piston rod being broken away immediately outward of the cylinder. Secured to one side of the lower portion of the cylinder 10, by means of the straps 15, which encircle the cylinder and are bolted thereto, is a vertically extending metal plate 16, and bolted to this plate are the upper and lower castings 17 and 18, and the intermediate casting 19, the former being spaced from the intermediate casting, as clearly shown in Figures 1 and 2, of the drawings. Bolted to the outer portions of the castings 17, 18, and 19, is a metal plate 20, and secured to this plate is an outwardly extending bracket 21, in which is pivotally supported the vertical control lever 22. The castings 17, 18, and 19, together with the plates 16 and 20, form a casing which serves as an air chest. Extending transversely of the bracket, inwardly of the lever, is a bolt 23, which serves as a stop, to limit the inward pivotal movement of the lever. Connected to the upper end of the cylinder 10 is one end of a pipe 24, which extends downwardly, outside of the cylinder, and is connected with the upper casting 17, at 25. A branch pipe 26, leads from this pipe 24, and is connected with the side of the cylinder, adjacent the upper end thereof. A pipe 27 is connected with the lower casting 18, and has the branch pipe 28, which connects with the side of the cylinder 10, adjacent the lower end, as clearly seen in Figures 1 and 2. The pipe 27 is connected with the cylinder 10, at a point below the branch 28, as shown at 29.

Referring particularly to Figure 4, the intermediate casting 19 comprises a block having the upper cylinder spaces 30 and 31, and the lower cylinder spaces 32 and 33, the cylinder space 30 being directly above the space 32, while the space 31 is directly above the space 33. A plate 34 is secured in covering relation to the upper open ends of the cylinders 30 and 31, while a plate 35 is secured in covering relation to the lower open end of the lower cylinder 32. In the respective cylinders, in the order above enumerated are the pistons 36, 37, 38, and 39. On the upper face of the upper plate 34, directly over the cylinder 30 is an upwardly extending tubular guide 40, in which is slidably disposed the rod 41, the lower end of which is adapted to be engaged by the upper end of the piston 36. The upper casting has a transverse chamber 42, in the lower wall of which is formed a valve seat 43, on which is seated the valve 44, said valve having a stem 45 slidably movable in a guide 46, in the upper wall of said chamber, said valve being adapted to be engaged and pressed against its seat by the rod 41. On the upper portion of the other end of the casting 17 is a chamber 47, in the lower wall of which is formed the valve seat 48, for receiving the valve 49, said valve having a downwardly extending stem 50, guided in the bushing 51, and having the coil spring 52 encircling it. This spring has its ends bearing against the bushing 51, in which the stem 50 slides, and against the transverse pin 54, in the lower end of the stem 50, whereby said valve is resiliently held against its seat. It will be noted that the lower end of the valve stem 50 extends through an opening 54', in the plate 34, so that said stem may be engaged and pushed upwardly by the piston 37, as will be more clearly explained later herein. As clearly seen in Figure 4, there is an opening 55, in the upper wall of the casting 17, to the left of the valve 44, over which is connected the beforementioned end 25, of the pipe 24. In the upper part of the casting 17 are the screw plugs 56 and 57, which permit access, respectively, to the stem of the valve 44, and to the valve 49.

The lower casting 18 has a transverse chamber 58, in the upper wall of which is formed the valve seat 59, and on which is upwardly seated the valve 60, said valve having the upwardly extending stem 61, slidably engaged in the guide 62, and held on its seat by the coil spring 61'. The sides of the guide are open to the atmosphere so that when the valve 60 is unseated, there will be a free passage from the chamber 58 to the atmosphere. In the lower wall of the chamber 58, directly beneath the valve 60, is a screw plug 63, which permits access to the said valve, and to the seat thereof. Removably secured in the upper wall of the casting 18, to the right of the valve 60, is a tubular guide 64, which slidably receives rod 65 resting on the valve 66, said valve being seated on a seat 67 formed in the lower wall of the chamber 58. Formed on the bottom of the casting 18, below the valve 66, is a chamber 68, and in the bottom wall thereof is a tubular guide which slidably receives the stem 69 of the valve 66, an access plug being screwed in the lower end of a tubular extension 70, of the chamber 68, as clearly seen in the drawings.

Leading from a suitable source of fluid supply, such as compressed air, is a pipe 71, which extends vertically along the lower portion of the cylinder 10, and has one end connected with one side of the upper chamber 47, as at 72, while the lower portion has a branch 73, which connects with a side of the lower chamber 68, at 74. The vertical portion of the pipe 71, in conjunction with the chambers 47 and 68, and the pipes 24 and 27, form the manifold of the device, from which the compressed air is drawn for delivery to the ends of the power cylinder 10. One of the wider sides of the casting 19 is flat, as shown at 75, and formed in this face is a groove, represented as a whole by the numeral 76, which includes the portions 77, 78, 79, 80, and 81, each joined to the adjacent portion by a slight angle, as shown in Figure 5. Adjacent the junction of the portions 77 and 78, of the groove, is a lateral branch groove 82. Between the portions 77—78 and the portion 81, is a groove 83, which extends in approximate parallel relation to the portion 77, said groove 83 having one end directed at an acute angle, as at 84, toward the portion 77. Between the groove 83, and the portion 81, is a short groove 85. Formed in the groove portion 78, and leading into the lower end of the cylinder 30 is a port 86, and in the same portion of the groove, and leading into the upper end of the cylinder 32, is a port 87. At the lower end of the portion 81, of the major groove, is a port 88, leading to the upper end of the cylinder 33. In the lower end of the short groove 85, is a port 89, leading into the lower end of the cylinder 31.

Bolted on the grooved face of the block 19 is a block 90, and formed in the contacting face of the block 90 are the ports 91, 92, 93, 94, and 95. The port 91 registers with the major groove at the point marked 96, the port 92 with the major groove at 97, while the ports 93, 94, and 95 register at the points marked, respectively, 98, 99, and 100. Formed transversely through the lower portion of the block 90 is a passage 101, having intermediate its ends the seat 102, on which is seated the valve 103, said valve being engaged by stem 104 extending through the opposite side of the block, and through packing 105. Outwardly of the said side of the block, the stem 104 is provided with a transverse pin 106, and encircling the stem, and bearing against the outer end of the bushing 107, of the packing 105, and against said pin, is a coil spring 108, which holds the packing in place and lever in neutral. In the outer end of the passage 101 is a removable plug 109, and between the valve 103 and said plug is a coil spring 110, which holds the valve on its seat. It will be noted, particularly Fig. 9, that the inner end of the port 95 is arranged at the intermediate portion of the valve 103, when said valve is seated, which is at a point in staggered relation to a second port 91, as before mentioned. Formed through the block 90 is a passage 111, having the seat 112 at a point intermediate its length, for the needle valve 113, said passage entering the lower end of the portion 77, of the major groove, at 114. Leading from the passage 111, adjacent the seat 112, is a port 115, which communicates with the cylinder 116, formed in the lower portion of the outer part of the block 90, and leading from this cylinder to the lower end of the groove portion 84, is a port 117, said port being shown as being in the same plane as the port 111. The cylinder 116 opens through the lower end of the block 90, and receives the threaded plug 118, said plug having the pet-cock 119 in its lower end for emptying the entire system of the motive fluid, when desired. In the cylinder, above the plug, is a piston 120, which has a cup washer 121 on its lower end, and a central vertical screw 122, the head of which lies below the bottom face of the piston for engagement with the upwardly extending boss 123, of the plug 118, whereby to prevent downward movement of the piston where the washer 121 might cover ports 133 and 117. Formed vertically through the block 90, directly above the cylinder, and communicating therewith, are the passages 124 and 125, with the intermediate recess 126 in the upper wall of the cylinder. In the upper ends of the passages 124 and 125, respectively, are the screw plugs 127 and 128. In the intermediate portion of the passage 124 is a seat 129, on which is engaged the valve 130, held in seated position by the coil spring 131 which bears against the upper face of the valve and the lower face of the plug 127. On the lower face of the valve 130, and extending downwardly into the lower portion of the passage 124, is a stem 132, which is adapted to be engaged by the piston 120, when said piston moves upwardly, whereby to unseat the said valve, against the tension of the spring 131. The opening for the screw 122 extends through the upper end of the piston, but the screw does not extend entirely therethrough, thus leaving a socket or recess 133, in which is seated the lower end of the coil spring 134, which has its upper end in a socket or recess 126, heretofore mentioned. Formed in the passage 125, and in the upper wall of the transverse port 98, is a seat 135, for the upwardly moving valve 136, and in the said passage, at the intersection of the port 98, is an enlarged space 137, which permits passage of fluid through the port 98, whether the valve 136 is seated or not. In the lower portion of the passage 125 is a vertically slidable block 138, and between the upper end of the block and the lower face of the valve 136, is a coil spring 139. The valve 136, the spring 139, and the block 138 are so arranged, with respect to the valve seat and the piston 120, that the valve normally remains open so that air, or other fluid may pass around the valve, and is adapted to be seated by upward movement of the block, through contact of the piston. It will be noted that upward movement of the piston, upon contacting with the stem 132, opens or unseats the valve 130, and at the same time closes the valve 136. Formed transversely through the block 90, above the passage 101, and in vertical alinement with the passage 101, are the passages 140 and 141. In the intermediate portion of the passage 140 is a seat 142, on which is engaged the valve 143, said valve having a stem 144 extending through the other side of the block, as clearly shown in Figure 9. In the outer end of the passage 140 is a removable screw plug 145, and arranged in the passage, between the said plug and the adjacent end of the valve 143, is a coil spring 146, which serves to hold the valve on its seat. It will be noted that the passage 97 intersects the passage 140 at a point where the valve 143 lies when seated, and that there is a port 97', at a point inwardly of the seat 142, which leads out through one edge of the block 90, for exhausting the fluid from the cylinders 32 and 33, through the major groove, at the point indicated at 96, in Fig. 13. In the intermediate portion of the passage 141 is a seat 147, on which is engaged the valve 148, said valve being held in seated position by the spring 149 disposed between the valve and a screw plug 150 engaged in the outer end of the passage, and being engaged by a stem 151, which extends through the other side of the block 90. The passage 99 intersects the passage 141 at a point where the valve 148 lies when seated, and in said passage, a short distance to the right thereof, as shown in Figure 9, is a port or passage 152, which extends outwardly through the same side or edge of the block 90, as that mentioned in connection with the port 97', and leads to the atmosphere, for exhausting the air from the cylinder 116, through the groove 83, at the point 99, in said groove.

The face 75, of the casting 19, with its grooves and ports, in combination with the block 90, and its grooves and ports, constitute what might be called a chest, for the distribution of compressed air to the various valves, pistons, etc.

Mounted on the plate 20 is the bracket 21 comprising the parallel plates 153, between which the outer ends of the stems 104, 144, and 151 project, and disposed vertically between these plates is the lower end of the lever 22, the same being pivoted on the bolt 155, disposed through said plates. It will be noted that, when the lever is in perpendicular position, the stems 144 and 104 are in contact with the adjacent edge face thereof, while the end of the stem 151 is spaced a slight distance from said edge of the lever.

Formed through the lever 22 is an opening 156 which is adapted to register with openings 157, formed through the plates, a short distance outwardly, for the purpose of receiving a pin to hold the lever in its outward position, with the stem 104 pushed inwardly, and the valve 103 unseated. Disposed transversely through the plates 153, inwardly of the lever, and adjacent the upper edges of said plates, is a bolt 23, against which said lever engages, when swung inwardly, whereby to limit such inward movement. It will be noted that, upon pushing the upper end of the lever inwardly, said lever contacts with, and pushes inwardly, to a slight degree, the stem 144, before it contacts with, and pushes inwardly the stem 151, whereby to unseat the valve 143 a short time in advance of the opening or unseating of the valve 148.

Connected with the branch pipe 73, and with the opening 95, at the outer end thereof, is a pipe 159, which conveys compressed air, or other suitable motive fluid, from the main line 71, in to the passage 101.

When the power piston 13 is at the upper end of the cylinder 10, and the operator desires to strike, or cause the piston to descend with the desired force to break the object being worked upon, the operator grasps the upper end of the control lever 22, and pulls same away from the cylinder 10, which results in the lower end of said lever engaging the outer end of the stem 104 and pushing same inwardly, whereby to unseat the valve 103. This permits air to pass from the port or passage 95 into the passage 101, and from thence into the groove portion 82, from which it flows into the major groove, and all of its portions. The air travels upwardly in the groove portion 78, a part of said air escaping through the port 87 into the upper end of the cylinder 32, causing the piston 38, therein, to move down against the end of the rod 61, pushing the valve 60 from its seat. Air also passes from the groove portion 78, through the port 86, into the lower end of the cylinder 30, causing the piston 36, therein, to move upwardly against the rod 41 which pushes the valve 44 on its seat. As the port 91, in the block 90 registers with the point 96, of the major groove, air will pass from said groove, through said port, into the passage 125, down said passage, around the valve 136, into the passage 98, but as the valve 130 is seated, none of the air can pass from the passage 98 to the lower portion of the passage 124. This air, however, by passing around the valve 136, enters the passage 98, and flows into the upper end of the groove 85, along this groove to the port 89, where said air enters the lower end of the cylinder 31, causing the piston 37, therein, to rise against the stem 50, of the valve 49, unseating said valve, which will be apparent from an inspection of Figure 4. It will also be noted that air travels along the major groove, to the port 88, through which the air enters the upper end of the cylinder 33, forcing the piston 39, therein, downwardly into engagement with the rod 65, which it pushes down, so that the valve 66 is forced onto its seat, closing communication with the chamber 68. Opening of the valve 49, establishes communication between the chambers 47 and 42, so that air from the chamber 47 may flow into the chamber 42, and out through the opening 55, to the pipe 24, which delivers air to the upper end of the cylinder 10, above the piston 13.

The piston 13 is then driven down to the bottom of the cylinder 10, by the force of the air thereabove, causing the tool connected with its rod 14 to strike and break the object or material being operated upon. While the above operations have been taking place, air has passed down into the portion 77 of the major groove, and thence into the passage or port 111, from said groove, at the point 114, and past the needle valve 113, through the port 115, and into the cylinder 116, causing the piston 120 to rise in the cylinder 116. As the piston 120 rises it strikes the block 138, which, through the aid of the spring 139, seats the valve 136, thus preventing air from the passage 91 from getting into the passage 98. At the same time the piston engages the stem 132 and unseats the valve 130, which permits air to pass from the cylinder 31, through port 89, into the groove 85, through the passage 98, around the valve 136, into the passage 124, past the valve 130, and to the atmosphere through the exhaust port 160, in one side of the block 90. Immediately that the air is exhausted from the cylinder 31, the piston 37 moves downwardly, and the valve 49 seats itself, under the influence of the spring 52. Air from the chamber 47, to the chamber 42, is thus cut off, whereby to prevent any more air entering the cylinder 10, above the piston 13. Thus a continuous flow of power fluid is prevented from entering the upper end of the power cylinder 10. This effectively regulates the size of the charge of fluid delivered to the power piston, which greatly economizes in the use of such fluid. When the chamber 42 is thus relieved of air pressure, the valve 44 is capable of unseating itself, when air is permitted to exhaust from the cylinder 30. It will be noted that the valve 60 is held in open position by the piston 38, whereby to permit exhaust of air from below the piston 13, to the atmosphere, by way of the lateral openings 62', in the guide 62.

It will be noted that, in pipe 27, where it connects with the power cylinder, below the exhaust connection 28, of said pipe with said cylinder, there is located a check valve 161, which valve opens inwardly toward the cylinder. As the piston 13 comes down, and air is being exhausted from the cylinder 10, through the chamber 58, a portion of such air is forced into the pipe 27. The connections 28 and 29 are so spaced apart, one above the other, that the piston 13, when opposite the exhaust connection 28, will act as a valve, to close the said connection, thereby trapping that portion of the air within the lower end of the cylinder 10, between the port 28 and the check valve 161. The check valve 161, opening inwardly toward the cylinder 10, prevents escape of the cushion of air from the cylinder, as will be understood. Thus, should the material, upon which the tool is being operated, suddenly break, and give away, the piston will be prevented from striking the lower end of the cylinder, which would injure the cylinder and piston. The same operation occurs at the upper end of the cylinder 10, through the medium of the check valve 161', which is located with respect to the upper end of the cylinder, and the connection 26, in a position corresponding to that of the check valve 161, with respect to the lower end of the cylinder and the connection 28. In view of the fact that the power piston 13 closes one or the other of the inlet ports, at the cylinder ends, air cannot enter the cylinder, to cause the raising or lowering of said piston. To overcome this, the trapped air, acts to move the piston to a sufficient degree to uncover the ports alternately, as will readily be understood.

The operator now pushes the lever 153 inwardly, which causes the inner vertical edge thereof, above the pivot 155, to engage the end of the stem 144, and push the same inwardly, whereby to unseat the valve 143, which permits air to leave the groove portion 79 by way of the port 97, past the said valve, and thence laterally to the atmosphere by means of the exhaust port 97'. Further inward movement of the lever 153 pushes inwardly the stem 151, unseating the valve 148, whereby air will leave the upper end of the groove 83, out through the passage 99, and laterally through the exhaust port 152, to the atmosphere. This exhausts the air from the cylinder 116, permitting the spring 133 to move the piston 120 to the bottom of the cylinder, with the result that the valve 130 is reseated by its spring 131, while at the same time the valve 136 becomes unseated, thus reestablishing communication between the ports 91 and 98, by way of the passage 125, and permitting air to exhaust from the cylinder 30, with the result that the valve 44 will be unseated. Air also escapes from the cylinders 32 and 33, through the major groove, and the ports 87 and 88, whereby the valve 60 is seated by means of its spring 61', and the valve 66 unseated, by being relieved of the pressure of the piston 39 and rod 65, whereupon the main air pressure in the chamber 68 will flow upwardly past the valve 66, to the pipe 28, and into the cylinder 10, below the piston 13, thereby causing said piston to rise to the upper end of said cylinder. The parts are now in position for another strike, which may be accomplished by an inward movement of the lever 22, to unseat the valve 103.

The volume of the charge of fluid entering the upper end of the power cylinder 10 can be regulated by adjusting the needle valve 113, inwardly or outwardly.

What is claimed is:

1. The combination with a power cylinder and its piston, of a mechanism mounted on the cylinder for controlling the movements of the piston in the cylinder comprising upper and lower chambers, a manifold connecting the chambers, inlet and exhaust valves in the chambers, pistons in the intermediate portion of the casing operable against the stems of the valves for actuating the same into and out of opened and closed positions, control valves in the intermediate part of the casing for controlling the movements of the pistons and thereby the opening and closing of said inlet, and exhaust valves, and a control lever for the last-named control valves.

2. The combination with a power cylinder and its piston, of a mechanism for controlling the movements of the piston in the cylinder comprising a casing mounted on said cylinder and having a manifold for a pressure fluid connected with the ends of said cylinder, and the ends of said casing, primary valves in the casing for regulating the flow of fluid from said manifold to the ends of the cylinder, an automatically operated valve for controlling the flow of fluid to and from the one of said primary valves, and a master valve for controlling the flow of fluid to the automatically operated valve, and to the other of said primary valves.

3. The combination with a power cylinder and its piston, of a mechanism for controlling the movements of the piston in the cylinder comprising a casing mounted on the cylinder and having a manifold for a pressure fluid connected with the ends of said cylinder, primary valves in the casing for controlling the flow of fluid to the ends of the cylinder alternately, fluid propelled means for actuating said primary valves, a secondary valve in the casing for regulating the flow of fluid to certain of the fluid propelled means, and alternately operated master valves for controlling the flow of fluid to and from the secondary valve and to the remaining fluid propelled means.

4. The combination with a power cylinder and its piston, of a mechanism for controlling the movements of the piston in the cylinder comprising a casing mounted on said cylinder and having a manifold for a pressure fluid connected with the ends of said cylinder, primary valves in the casing for controlling the flow of fluid to and from the ends of the cylinder through said manifold, pressure operated pistons in the casing for actuating said primary valves, a secondary valve in the casing for controlling the flow of fluid to one of the pressure operated pistons, and alternately operated master valves for controlling the flow of fluid to and from said secondary valve, and to the remaining pressure operated pistons.

5. The combination with a power cylinder and its piston, of a mechanism for controlling the movements of the piston in said cylinder comprising a casing mounted on the cylinder and having a manifold connected with the ends of the cylinder, primary valves in the casing for controlling fluid to and from the cylinder through said manifold, floating pistons in the casing for actuating said primary valves, an automatically operated valve in the casing for controlling the movements of certain of said floating pistons, and alternately operated master valves for controlling fluid to said automatically operated valve and to the remaining floating pistons, whereby to cause striking and lifting charges of fluid, only, to be directed against the power piston.

6. The combination with a power cylinder and its piston, of a mechanism for controlling the movements of the piston within the cylinder comprising a casing mounted on said cylinder having a manifold for pressure fluid connected with the ends of said casing and the ends of said cylinder, inlet and exhaust valves in the ends of the casing, pressure actuated pistons for operating said inlet and exhaust valves, a pressure actuated valve for controlling the flow of pressure fluid to and from certain of said pistons, and alternately operated master valves for controlling the flow of pressure fluid to the pressure actuated valve and the remaining pressure actuated pistons.

7. The combination with a power cylinder and its piston, of a mechanism for controlling the movements of the piston within the cylinder comprising a casing mounted on said cylinder having a manifold for pressure fluid connected with the ends of the casing and the ends of said cylinder, an air inlet chamber in each end of the casing, an air exhaust chamber in each end of the casing having a communication with the inlet chamber, and having a communication with the atmosphere, a controlling valve in each of the said communications, pressure actuated pistons in the casing each arranged for actuating a controlling valve, a chest on the casing communicating therewith, a valve in the chest for controlling the flow of pressure fluid to and from certain of the said pistons, and master valves for controlling the flow of pressure fluid to and from said chest valve, and to and from the remaining pistons.

8. The combination with a power cylinder and its piston, of a mechanism for controlling the movements of the piston within the cylinder comprising a casing mounted on said cylinder, a manifold for pressure fluid connected with the ends of the said casing and cylinder, an air inlet chamber in each end of the casing connected with said manifold, an air exhaust chamber in each end of the casing communicating with the inlet chamber and with the atmosphere, inlet and exhaust valves in said chambers, pressure actuated pistons in the casing for controlling the inlet and exhaust valves, a chest on the casing, connections between the chest and the manifold, ports and passages in the chest communicating with the pressure pistons, valves in the chest, one of said chest valves being automatically operated to control the flow of pressure fluid to and from the pressure actuating piston, for one of the inlet valves, and alternately operated master valves for controlling the supply and exhaust to the automatic valve and to the pressure actuated pistons for the other inlet valve and the exhaust valves.

9. The combination with a power cylinder and its piston, of a mechanism for controlling the movements of said piston within said cylinder including an inlet valve, power fluid operated means for opening said valve to admit a charge of fluid to said cylinder, means for controlling the flow of power fluid to said fluid operated means, means for closing said valve, and automatically operated means for relieving said fluid operated means of power fluid to permit said valve to close after said charge has been admitted to said cylinder.

DON HEYER.